(No Model.) 3 Sheets—Sheet 1.
G. L. JAEGER.
PULP DRAINER.
No. 483,847. Patented Oct. 4, 1892.
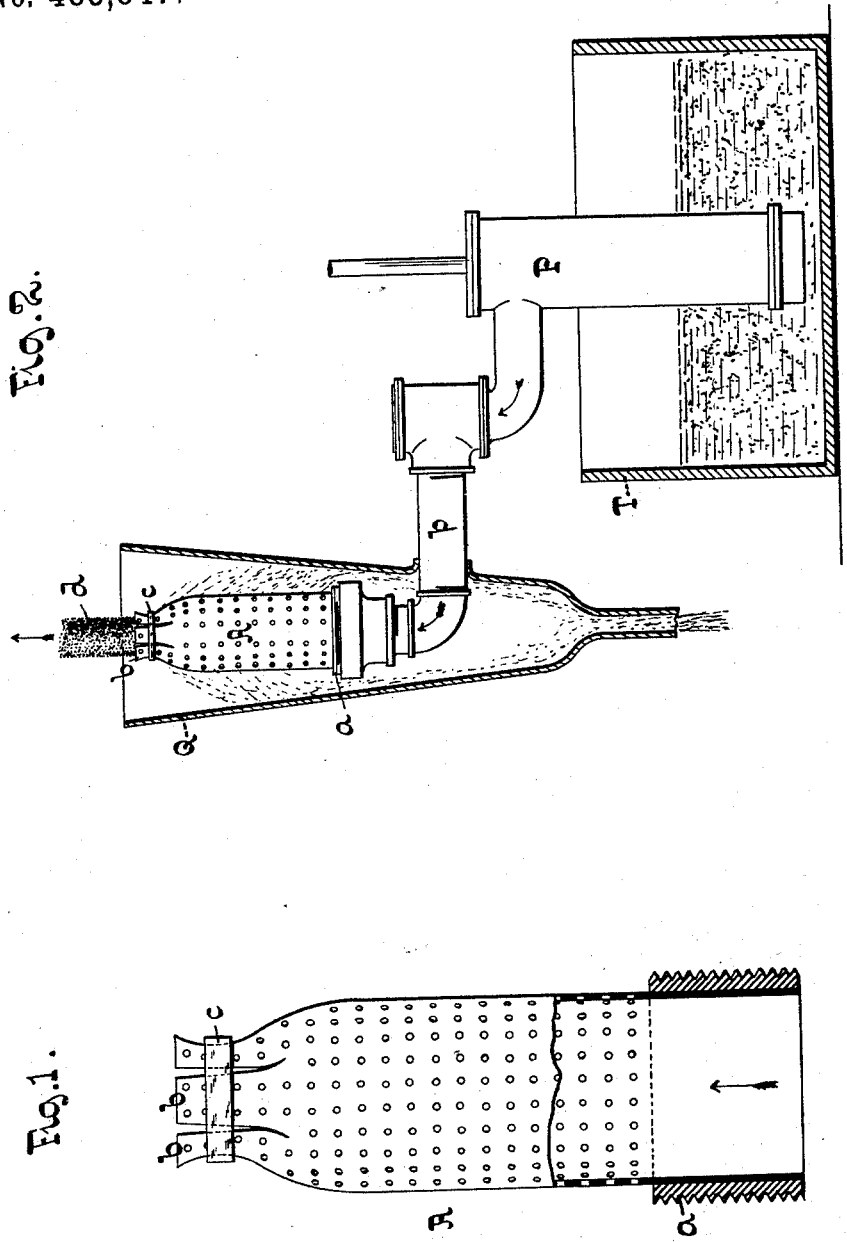
WITNESSES:
A. Faber du Faur
INVENTOR:
Gustav L. Jaeger,
BY A. Faber du Faur
his ATTORNEY (No Model.)  3 Sheets—Sheet 2.

G. L. JAEGER.
PULP DRAINER.

No. 483,847.  Patented Oct. 4, 1892.

WITNESSES:
A. Faber du Faur
W. H. Bristol

INVENTOR:
Gustav L. Jaeger
BY A. Faber du Faur
his ATTORNEY (No Model.) 3 Sheets—Sheet 3.

G. L. JAEGER.
PULP DRAINER.

No. 483,847. Patented Oct. 4, 1892.

WITNESSES:
A. Faber du Faur

INVENTOR:
Gustav L. Jaeger,
BY A. Faber du Faur
his ATTORNEY

UNITED STATES PATENT OFFICE.

GUSTAV L. JAEGER, OF NEW YORK, N. Y.

PULP-DRAINER.

SPECIFICATION forming part of Letters Patent No. 483,847, dated October 4, 1892.

Application filed May 12, 1891. Serial No. 392,531. (No model.)

*To all whom it may concern:*

Be it known that I, GUSTAV L. JAEGER, a citizen of the United States, and a resident of New York, in the county and State of New York, have invented certain new and useful Improvements in Pulp-Drainers, of which the following is a specification.

The object of my invention is to extract or drain the liquid from a mixture of solid and liquid matter—such as paper-pulp, sugar-sirup, malt-mash, &c.—and to continuously discharge the drained and compressed solid matter.

With this object in view my invention consists, essentially, in a pulp-drainer composed of a foraminous receptacle provided with an inlet for the pulp at one end and with a contracted outlet for the solid matter at the opposite end, combined with external means for continuously supplying pulp under pressure to the receptacle, all of which is more fully pointed out in the following specification and claims and illustrated in the accompanying drawings, in which—

Figure 1 is an elevation of a foraminous receptacle. Fig. 2 shows the receptacle of Fig. 1 attached to a pulp-pump. Figs. 3, 4, 5, and 6 represent modifications.

In the example shown in Fig. 1, A represents a foraminous vessel consisting of a perforated sheet-metal cylinder soldered at its lower end to a nipple $a$ for connecting it to the force-pipe of the pump. The upper end $b\ b$ is slit and a rubber ring $c$ passed over it so as to contract the outlet and create a resistance to the discharge of solid matter.

Fig. 2 shows the perforated receptacle A, attached to the force-pipe $p$ of the pump P, which draws the pulp from a tank T. Q is a funnel surrounding the receptacle A for receiving and carrying off the liquid discharged through the perforations.

Figure 3:
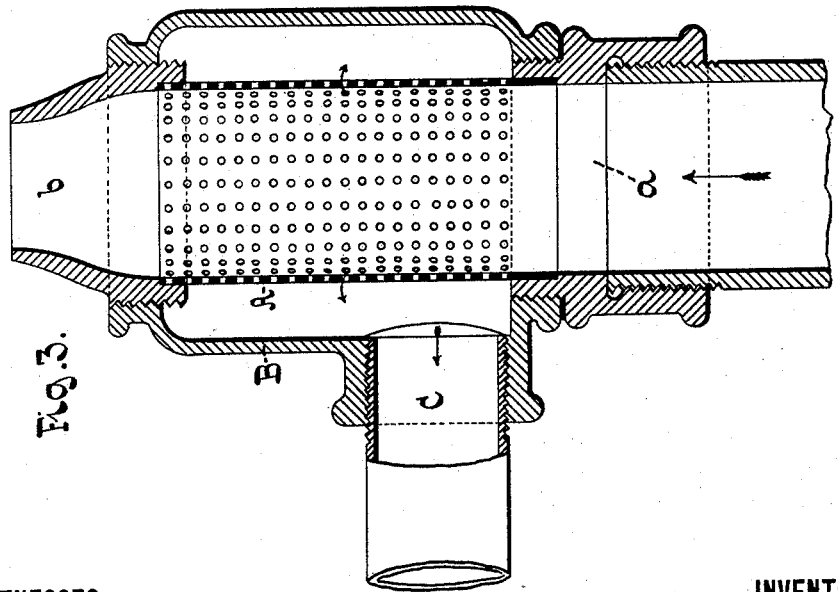

In the example shown in Fig. 3 the foraminous receptacle A consists, likewise, of a perforated cylinder. It is secured between the inlet-coupling $a$ and the nozzle $b$, which are screwed into a shell B, surrounding the perforated cylinder A and provided with an outlet C for the liquid drained off.

Figure 4:
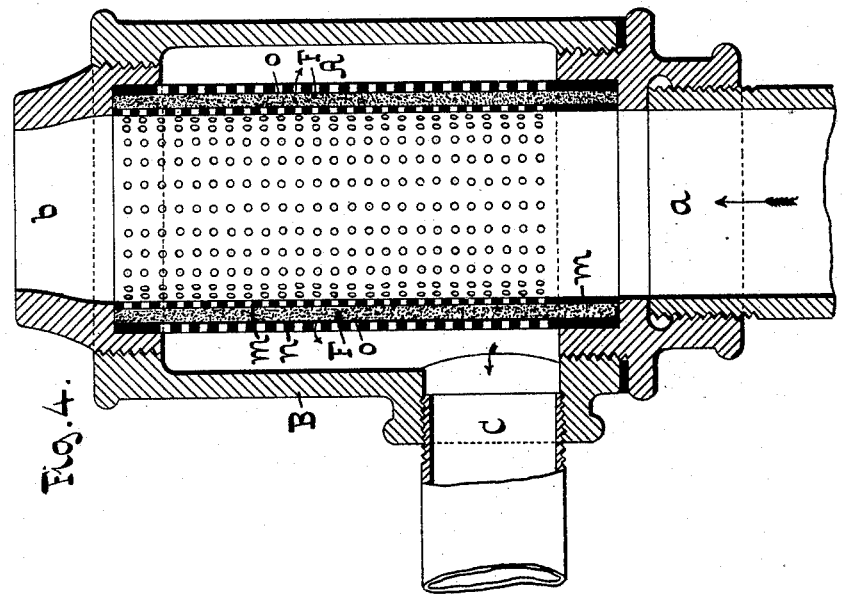

In the example shown in Fig. 4 the foraminous receptacle A is formed of an inner perforated cylinder $m$ and an outer perforated cylinder $n$, the space $o$ between the two being filled by suitable filtering material F, such as felt, cloth, sand, gravel, charcoal, &c. The space $o$ may also be subdivided and the compartments filled with different materials.

Figure 5:
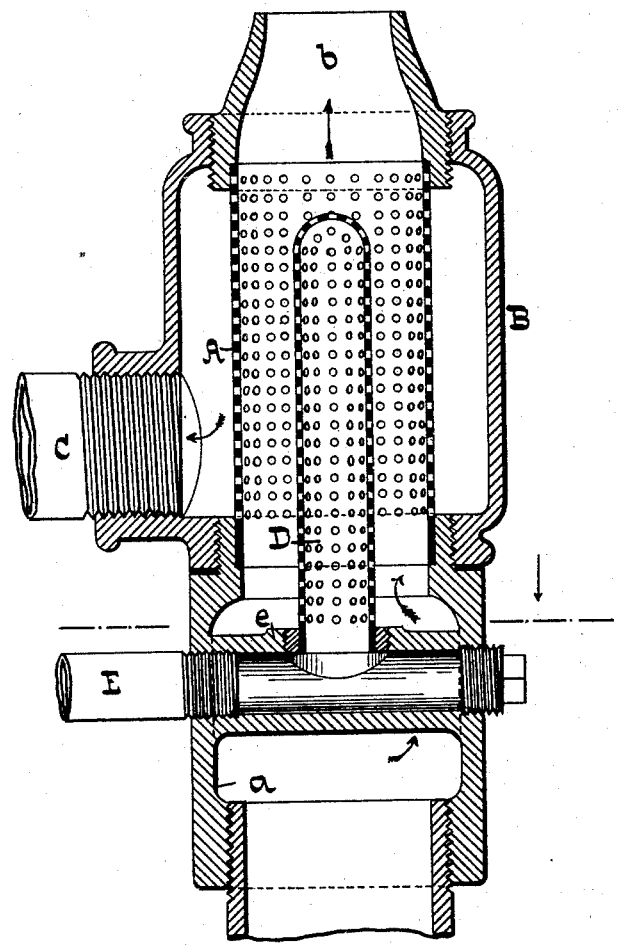
Figure 6:
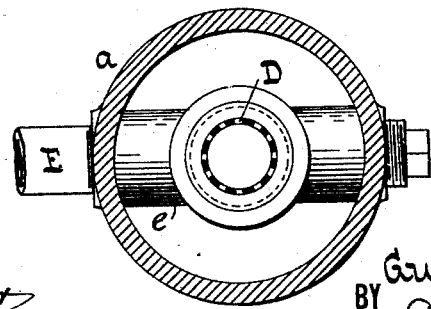

In the example shown in Figs. 5 and 6 I have shown, in addition to the foraminous receptacle A, a central strainer D, which may be simply a perforated tube, as shown, or may be covered by filtering material, and which is screwed into a hollow bridge $e$ of the nipple $a$. A pipe E carries the liquid off. This central strainer may also be used for the admission of liquid into the foraminous vessel A for washing or for thinning the pulp.

In all of the figures the discharge-nozzle for the solid matter is shown facing upward; but the apparatus may be placed in any other position. I prefer, however, to have the discharge directed upwardly for pulp containing solid matter which floats in the liquid or is of about the same or of less specific gravity than the liquid, while for heavier I prefer to turn the nozzle downward or in a horizontal direction.

In starting the apparatus a sufficient stock of solid matter must first be formed to fill the discharge-nozzle. This may be effected by temporarily stopping up the discharge or by slowly feeding the pulp so as to allow the liquid to drain off without overflowing through the nozzle. When a sufficient quantity of drained solid matter has accumulated, the discharge is opened and the pulp fed under pressure, when the liquid is drained off through the walls of the foraminous receptacle, while the drained and compressed solid matter is discharged through the nozzle $b$ in a continuous body, like $d$, Fig. 2.

My invention is not limited to any particular shape or construction of the foraminous receptacle, which receptacle, instead of being cylindrical, as shown, may be in the form of a globe or of any other suitable shape; nor is it limited to any particular form or cross-section of the discharge-nozzle, which latter may be made to suit the cross-section it is desired the solid matter should have. It may, for instance, be square, so that the product can be packed or stored without loss of space.

The resistance to the discharge of the drained solid matter is regulated by the shape and length of the nozzle, or in case of an elastic nozzle such as shown in Fig. 1 by the lateral pressure, and the feed must be regulated so as to maintain the proper pressure. The pulp may be fed under pressure by any suitable external means, such as an ejector or an elevated tank.

My invention is particularly applicable to the draining and forming of paper-pulp; but it may be applied to various other purposes. When glue or other cementing solutions are used in connection with the solid material, the part of the liquid drained off may be added to a fresh quantity of the solid material. Thus, for instance, if it be desired to form moldings from paper-pulp drained pulp is mixed with a sufficient quantity of boiled glue to make it thin enough for pumping and the drained liquid used over for another portion of drained pulp.

The feed of the pulp and the discharge of the solid matter (called "continuous" in the specification and claims) need not to be continuous in the narrowest sense of the word, but may be intermittent, as it will be when a single-acting pump is used. The discharge may be against an outside resistance, like a valve held against the opening by a weight or spring.

What I claim as new, and desire to secure by Letters Patent, is—

1. In a pulp-drainer, a foraminous receptacle provided with an inlet for the pulp and with a contracted outlet for the solid matter and external means connected with the inlet of the receptacle for supplying pulp under pressure, substantially as described.

2. In a pulp-drainer, a foraminous receptacle provided with an inlet for the pulp and with an outlet for the drained solid matter, said receptacle consisting of two concentric bodies with an interposed filtering material, and external means connected with the inlet of the receptacle for supplying pulp under pressure, substantially as described.

3. In a pulp-drainer, a foraminous receptacle provided with an inlet for the pulp and an outlet for the drained solid matter, a shell B, surrounding the receptacle and provided with a discharge-opening, and external means for supplying pulp under pressure, substantially as described.

4. In a pulp-extractor, a foraminous receptacle provided with an inlet for the pulp and with an outlet for the drained solid matter, a central foraminous body, and means for supplying pulp under pressure, substantially as and for the purpose specified.

In testimony that I claim the foregoing as my invention I have signed my name in presence of two witnesses.

GUSTAV L. JAEGER.

Witnesses:
A. FABER DU FAUR,
F. FOHR.